United States Patent Office 2,757,107
Patented July 31, 1956

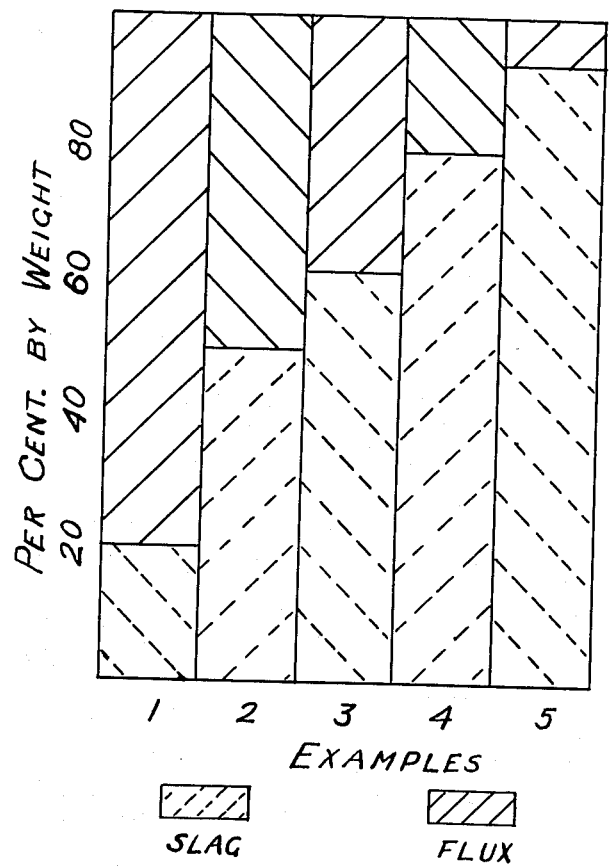

2,757,107
METHOD OF DESCALING STEEL

James J. Heger, Bridgeville, and Michael A. Orehoski, Duquesne, Pa., assignors to United States Steel Corporation, a corporation of New Jersey Application September 25, 1953, Serial No. 382,346

1 Claim. (Cl. 148—12.1)

This invention relates to the treatment of heated masses of steel to remove or condition the layer of oxide or scale formed thereon by atmospheric oxidation during heating.

In the hot-working of carbon, alloy, and stainless steels to the desired shape and condition, the oxide scale which forms when the steel is exposed to an oxidizing atmosphere while or after being heated to the hot-working temperatures, causes defects on the surfaces of the wrought steel and is also damaging to the hot-working tools. This detrimental effect of scale has been found to be particularly serious for the hot-extrusion process but it is also quite a problem in other hot-working processes such as rolling, forging, spinning, upsetting and piercing.

In the past, attempts have been made either to remove the scale from the heated article before hot-working or to heat the article in an atmosphere which prevents or reduces the formtaion of oxide scale. Among the methods which have been used to remove scale are water-spraying the heated article and mechanical abrasion or scraping. Methods which have been used to minimize scale formation include heating in a salt bath, in atmospheres that have a minimum amount of oxygen or in a vacuum.

None of these methods has been completely satisfactory. Mechanical descaling as by water-spraying or abrasion does not remove all of the scale from the article. In addition, the use of mechanical methods for removing scale involves a delay between the time when the article is heated to the hot-working temperature and the time when the working is actually performed. This delay often results in a temperature drop which, for those metals having a narrow hot-working range, may cause difficulties during the hot-working operation. Heating in controlled atmospheres, in a vacuum, or in salt baths, is an effective way of minimizing the formation of an oxide scale but such heaitng methods are expensive and for this reason have not found wide usage.

We have found that the scale formed on steel masses during or after heating preparatory to hot-working may be easily removed or converted to non-injurious condition by immersion in a bath of molten slag. The slag may be that formed naturally in smelting iron ore or may be a synthetic product composed of a mixture of two or more metal oxides. Such a bath has the effect of dissolving the scale forming on heated masses of steel or rendering it soft enough to be readily detached by hot-working tools without injury thereto or to the surface of the wrought masses. We find it preferable to add to the slag a flux capable of lowering the melting point and increasing the fluidity thereof.

A complete understanding of the invention may be obtained from the following detailed explanation of several typical examples, the slag-flux ratios of which are shown graphically in the chart which is the single figure of the accompanying drawing.

Referring now in greater detail to the precise mode of carrying out our invention, we provide a bath of molten slag of sufficient volume to permit immersion therein of the articles or masses to be treated, i. e., slugs, billets or blanks, after they have been heated to hot-working temperature. A suitable slag may be made by melting together the oxides of any two or more metals from the group consisting of calcium, silicon, aluminum and magnesium. Instead of a synthetic slag made by melting metal oxides, we may employ a natural slag such as that formed in the reduction of iron ore to metallic iron in the blast-furnace.

According to our invention, we maintain the slag bath at about the hot-working temperature for carbon steel, i. e., from 2000 to 2500° F., usually about 2250° F., and immerse the heated articles or masses therein after they have been passed through a heating furnace or other means to raise them to that temperature, and just prior to the actual hot-working thereof. The immersion is continued until the oxide layer is substantially removed or converted to a softened condition such that its presence does not cause any difficulty in hot-working. This usually requires only two or three minutes. The articles are then removed from the bath and put through the hot-working process immediately before a further substantial surface layer of scale can be formed by exposure to the oxygen of the atmosphere.

While descaling of carbon or alloy steel can be accomplished successfully by immersion in a bath of natural or synthetic slag as described, a specific example of which is a bath of molten slag as tapped from the iron blast-furnace, we find it preferable to modify such natural slag or its synthetic equivalent by adding thereto one or more fluxing agents from the group consisting of borax, soda ash, fluorspar, cryolite and lead or zinc oxide. The proportion of such added flux may vary widely as shown in the accompanying chart illustrating graphically the composition of several numbered examples of our descaling bath, as divided on a weight basis between slag and flux. As illustrated, the slag-flux ratio varies between 20–80 and 93–7. The composition of the several typical examples of our descaling bath is given below:

TABLE I
*Percentage of components by weight*

|  | Example 1 | Example 2 | Example 3 | Example 4 | Example 5 |
|---|---|---|---|---|---|
| Slag—Components: |  |  |  |  |  |
| Lime | 5 | 25 | 33 | 40 |  |
| Silica | 15 | 25 |  | 40 | 3 |
| Alumina |  |  | 33 |  |  |
| Blast-furnace Slag |  |  |  |  | 90 |
|  | 20 | 50 | 66 | 80 | 93 |
| Flux—Components: |  |  |  |  |  |
| Fluorspar |  | 25 | 17 | 10 |  |
| Cryolite |  | 25 | 17 | 10 |  |
| Borax | 50 |  |  |  | 7 |
| Soda Ash | 30 |  |  |  |  |
|  | 80 | 50 | 34 | 20 | 7 |

It will be observed that the sub-totals of slag-component percentages and flux-component percentages in the cases of the five examples given in Table I are those plotted in the accompanying graph.

The presence of a flux in the bath causes it to wet the scale adhering to the steel masses and dissolve it more readily, in addition to lowering the melting point and increasing the fluidity of the bath as aforesaid.

Molten slag baths of the compositions given for examples 1 and 2 were quite fluid above 1800° F. and were effective rapidly to descale both carbon and stainless steel when heated bars thereof were immersed in the baths. Baths of the compositions of examples 3, 4 and 5 also effectively descaled heated bars of carbon and stainless steel immersed therein but their action was somewhat less rapid than that observed in tests of Examples 1 and 2.

After removal from the bath, the steel masses are substantially free from adherent scale or oxide and any small amount of scale remaining thereon is converted by reaction with the bath components, to a condition in which it is too soft to cause defects in the surface of the hot-worked product or injury to the hot-working tools.

The method of our invention is characterized by several advantages. First, the descaling action is efficient and rapid. Second, the process is simple and inexpensive, requiring no specialized skill, technique or equipment. In addition, descaling baths according to our invention have melting points well below and boiling points well above the hot-working temperature range for carbon and alloy steels and are not corrosive in respect to either. Thus immersion beyond the time actually required for descaling is not detrimental.

Although we have disclosed herein the preferred practice of our invention, we intend to cover as well any change or modification therein which may be made without departing from the spirit and scope of the invention.

We claim:

In a method of treating a scaled mass of steel preparatory to hot-working, after it has been heated to hot-working temperature, the steps including providing a bath of molten slag comprising from 20 to 93% of a mixture of at least two metal oxides from the group consisting of calcium oxide, silica, alumina and magnesia, and from 80 to 7% of flux selected from the group consisting of borax, soda ash, fluorspar, cryolite and lead and zinc oxides, maintaining the slag at a temperature approximating said hot-working temperature, immersing the steel mass in said bath, permitting it to remain therein until the scale initially present on the surface of said mass has been substantially removed, then removing the mass from the bath and hot-working it substantially immediately.

References Cited in the file of this patent

UNITED STATES PATENTS

| | | |
|---|---|---|
| 361,795 | Wassell | Apr. 26, 1887 |
| 376,421 | Wassell | Jan. 10, 1888 |